United States Patent [19]

Evans et al.

[11] Patent Number: 5,353,981
[45] Date of Patent: Oct. 11, 1994

[54] NEAR-AMBIENT PRESSURE BRAZE CONSOLIDATION (LPC) PROCESS FOR FIBER REINFORCED MAGNESIUM METAL MATRIX

[75] Inventors: Donald B. Evans; Rex C. Claridge, both of Redondo Beach, Calif.

[73] Assignee: TRW Inc., Redondo Beach, Calif.

[21] Appl. No.: 983,917

[22] Filed: Dec. 1, 1992

[51] Int. Cl.$^5$ ............................................. B23K 35/28
[52] U.S. Cl. ................................. 228/190; 29/419.1; 228/262.51; 420/403; 420/408; 420/411
[58] Field of Search ................... 228/190, 263.17, 219; 29/419.1; 428/608, 614; 420/408, 411, 403; 263/262.51

[56] References Cited

U.S. PATENT DOCUMENTS

| | | | |
|---|---|---|---|
| 1,712,989 | 5/1929 | Gann | 420/408 X |
| 2,453,444 | 6/1945 | Loonam | 420/411 |
| 3,294,526 | 12/1966 | Koeplinger | 420/580 X |
| 3,615,277 | 10/1971 | Kreider et al. | 428/608 |
| 3,888,661 | 6/1975 | Levitt et al. | 428/608 X |
| 3,900,150 | 8/1975 | Delgrosso et al. | 228/190 X |
| 3,936,277 | 2/1976 | Jakway et al. | 428/608 |
| 5,042,710 | 8/1991 | Siemers et al. | 228/190 X |

FOREIGN PATENT DOCUMENTS 190180  12/1966  U.S.S.R. ................. 420/411

Primary Examiner—Kenneth J. Ramsey

[57] ABSTRACT

A low pressure process of producing graphite fiber metal matrix composite (Gr/MMC) structures comprising brazing graphite-magnesium metal matrix composite precursors or tapes using a soldering alloy consisting essentially of magnesium and one or more of aluminum, zinc, lithium and silver.

16 Claims, 1 Drawing Sheet

NEAR-AMBIENT PRESSURE BRAZE CONSOLIDATION (LPC) PROCESS FOR FIBER REINFORCED MAGNESIUM METAL MATRIX

BACKGROUND OF THE INVENTION

The invention is directed to graphite fiber reinforced metal matrix composite structures. Graphite fiber reinforced magnesium matrix composite structures (hereinafter referred to as "Gr/Mg MMC") are a recent development in lightweight and high stiffness structural materials. These materials are attractive because they combine low density, high stiffness moduli, and low coefficients of thermal expansion in a single material. Gr/Mg MMC materials are presently manufactured in useful shapes, such as sheets and tubes, by making a lay-up of the desired shape from a precursor Gr/Mg MMC form, such as, thin tape or wire. The lay-up is then bonded together and densified by a hot press diffusion bonding process. Hot press diffusion bonding processes presently used include heated die pressing, inflatable mandrel/pressure bag compressing, pultrusion, and hot isostatic pressing. To be successful, these processes must produce pressures on the order of 3,000 psig to 5,000 psig at temperatures around 900° F. to achieve proper consolidation of the composite precursor materials. To obtain and contain this combination of high pressure and elevated temperature to consolidate the Gr/Mg MMC precursor materials, heavy, complex and expensive tooling is required. This tooling becomes even larger, more complex and even much more expensive as the desired size of the Gr/Mg MMC structure increases in size. The tooling requirements for hot press diffusion bonding pose significant limits on the maximum size of the structure that can be produced.

If less costly means could be developed for producing the Gr/Mg MMC structures, such structures would be more widely utilized, such as for large spacecraft structures, space based telescopes, spaced based optical systems, spacecraft and space stations. Such structures will also have application in missiles and in aircraft, both military and civilian.

SUMMARY OF THE INVENTION

The present invention is directed to a low pressure process for producing graphite fiber reinforced metal matrix composite (Gr/Mg MMC) structures comprising the steps of sandwiching Gr/MMC precursors with a metal soldering alloy having a liquidus temperature and soldering temperature below the melting temperature of the metal matrix alloy of the Gr/MMC precursor to form a Gr/MMC lay-up, the soldering temperature of the metal soldering alloy being greater than its liquidus temperature; and soldering the Gr/Mg MMC lay-up by compressing the lay-up at moderate pressures while heating the lay-up to the soldering temperature of the metal soldering alloy to melt the metal soldering alloy in the lay-up and have the molten soldering alloy flow, wet and solder the Gr/MMC of the lay-up to form the Gr/MMC structure.

Preferably, the soldering step is carried out under an inert atmosphere, such as a helium atmosphere or argon atmosphere, or in a vacuum.

The soldering process can be carried out at moderate pressures of 100 psig or less. While the soldering step can be carried out at higher pressures, there is no need to do so.

For graphite magnesium metal matrix composites (Gr/Mg MMC), the metal soldering alloy is preferably a magnesium alloy. Preferably the liquidus temperature of the metal soldering alloy is between about 300° C. and about 450° C. Preferably the soldering temperature of the metal soldering alloy is between about 325° C. and about 475° C. Although the invention is described with a composite made from magnesium matrix alloy, composites can also be made from aluminum matrix alloys and copper matrix alloys employing metal soldering alloys compatible with such metal matrix alloys.

Especially preferred magnesium metal soldering alloys include the following four (4): The first alloy contains about 31 to about 33 weight percent aluminum, about 1 to about 3 weight percent zinc with the balance being magnesium. The second alloy contains about 38 to about 40 weight percent lithium, about 1 to about 3 weight percent zinc with the balance being magnesium. The third alloy contains about 47 to about 49 weight percent silver, about 1 to about 3 weight percent zinc with the balance being magnesium. The fourth alloy contains about 33 to about 34 weight percent aluminum, about 33 to about 34 weight percent lithium with the balance being magnesium.

In an alternative embodiment of the present invention, the Gr/MMC precursor is coated with a metal soldering alloy coating. Conveniently, the Gr/MMC form can be coated with a slurry coat of the powdered metal soldering alloy suspended in a solvent which is easily evaporated, such as alcohol. Alternatively, the Gr/MMC precursors can have the metal soldering alloy coating applied by vapor deposition or sputtering. The later two (2) methods involve several constraints. The coating method must not significantly change the composition of the metal soldering alloy. Thus, the metal soldering alloy must have the desired composition after coating to yield a metal soldering alloy having the desired liquidus and soldering temperature. The metal soldering alloys can have liquidus temperatures which are relatively sensitive to composition changes. The coating of the metal soldering alloy must be thick enough to provide sufficient metal soldering alloy to flow, wet and solder the metal matrix of the Gr/MMC precursors. It is the ability of the metal soldering alloy to flow and wet and solder that distinguishes a metal solder bonded joint, which can be formed with little or no externally applied pressure, from a diffusion bonded joint which normally requires high pressures and temperatures to form a sound bond. We believe that a minimum metal solder alloy thickness in the range of 0.0005 inch to 0.001 inch will be required to carry out the present invention. Vacuum metallizing and sputtering are capable of producing metal soldering alloy layers of this thickness given sufficient process time.

A DETAILED DESCRIPTION OF THE INVENTION

Figure 1:
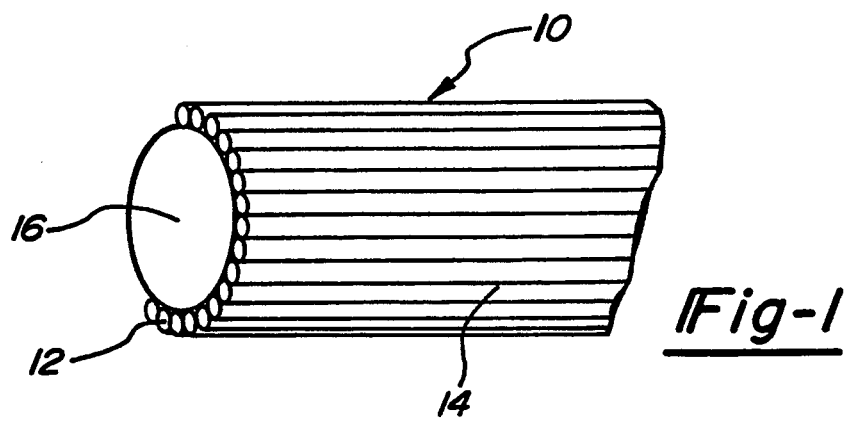
FIG. 1 is a prospective view of a Gr/MMC precursor wire coated with metal soldering alloy in an axial lay-up.

An object of the present invention is to provide a low pressure consolidation process to produce adequately consolidated Gr/MMC structures from precursor Gr/MMC forms, such as tape and/or wire, that are presently used in hot press diffusion bond processes. The principle object is to be able to obtain consolidation at pressures of 100 psig or less. A low pressure consolidation process requires tooling that is much simpler, lighter and cheaper than the tooling required for the conventional hot press diffusion bond processes. More importantly, a low pressure consolidation process would allow, in economic and engineering terms, for the production of tooling to produce larger and more complex consolidated shapes than are presently made with the hot press diffusion bond processes.

The present processes will be described with respect to graphite magnesium metal matrix composites (Gr/Mg MMC) made from magnesium alloy matrixes. The process is carried out by sandwiching Gr/Mg MMC precursor forms, i.e., tapes, strips, wires, etc., between magnesium soldering alloy in a lay-up. The lay-up can be used to produce piping, tubes, sheets (planar or curved), bodies, wings, and other two dimensional and three dimensional forms and shapes. The precursor Gr/Mg MMC can be in the form of tape, wire or sheets. The lay-up, after assembly, is compressed under moderate pressure substantially less than 3,000 psig and heated to a sufficient temperature wherein the magnesium soldering alloy melts, flows and solders the precursor Gr/Mg MMC in the lay-up to achieve consolidation into a single unit of the desired form or shape.

The present process requires the use of a magnesium soldering alloy with a sufficiently low soldering temperature so that the magnesium matrix alloy of the Gr/Mg MMC is not melted during the soldering operation. Commercial ternary magnesium soldering alloys, such as, AX 92 or AZ 125 have solidus temperatures around 600° C. which are too high for soldering all but the highest melting point magnesium matrix alloys of Gr/Mg MMC. These are also the magnesium soldering alloys with the smallest amount of alloying elements, and because of their low percentage of alloying elements, have the lowest mechanical strengths. To solder bond high strength magnesium alloys, such as, the ZK or ZH series alloys, lower melting point solders are required. A magnesium soldering alloy having a liquidus temperature between about 300° and 450° C. and a soldering temperature between about 325° and 475° C. is required. Such alloys do not appear to be in wide spread use. However, we have found four (4) alloys which meet the above requirements. These alloys have the following composition and exhibit the following characteristics:

TABLE 1

| Approximate Metal Alloy Composition | Estimated Liquidus Temperature | Estimated soldering Temperature |
| --- | --- | --- |
| Mg: 68% to 64% Al: 31% to 33% Zn: 1% to 3% | | |
| Mg: 61% to 57% Li: 38% to 40% | 425° C. | 450° C. |

TABLE 1-continued

| Approximate Metal Alloy Composition | Estimated Liquidus Temperature | Estimated soldering Temperature |
| --- | --- | --- |
| Zn: 1% to 3% Mg: 52% to 48% Ag: 47% to 49 | 325° C. | 350° C. |
| Zn: 1% to 3% Mg: 32% to 34% Al: 34% to 33% | 450° C. | 475° C. |
| Li: 34% to 33% | 300° C. | 325° C. |

The percentages in the above composition are weight percent.

Preferably, the soldering step is carried out under an inert gas or in a vacuum environment to prevent oxidation. Alternatively, the soldering operation can be carried out as a dip soldering operation wherein the lay-up in inserted into a molten bath of the soldering material. However, this later method suffers from the disadvantage that it requires sizeable and expensive equipment.

The most straight forward method of carrying out the present process is to apply the metal soldering alloy material in the form of thin sheets or strips which are inserted between sheets of the Gr/Mg MMC precursor in the lay-up. However, the metal soldering alloy can be applied to the Gr/Mg MMC precursor material in the form of a powdered slurry or paste suspended in a volatile carrier, such as alcohol. It is also possible to use more advanced coating methods such as physical vapor deposition or sputtering. As mentioned above, those methods have some constraints but should be amenable to use.

Although the above process has been described with respect to graphite fiber reinforced magnesium matrix composites, the process can also be used with graphite fiber reinforced aluminum matrix composites and with graphite fiber reinforced copper matrix composites. For these later systems, commercially available soldered compositions for aluminum and copper, respectfully, can be used because the metal soldering alloys have soldering temperatures less than the melting point of the metal alloy matrix of the graphite fiber reinforced metal matrix composite.

Magnesium metal alloys are particularly susceptible to corrosion from chloride. Accordingly, if the magnesium soldering alloy contains chloride flux, the flux must be completely cleaned off the Gr/Mg MMC structure after the soldering operation to minimize corrosion. When soldering is carried out in a vacuum or under an inert atmosphere, flux will normally not be required.

Referring to FIG. 1, a Gr/Mg MMC lay-up 10 is shown comprising Gr/Mg MMC wire 12 axially aligned along mandrel 16. The wire 12 is coated with a magnesium soldering alloy having a liquidus temperature below the soldering temperature of the magnesium soldering alloy. Moreover, the magnesium soldering alloy has a soldering temperature below the melting temperature of the magnesium alloy matrix of the Gr/Mg MMC wire. The mandrel is made of material that is not wetted by the soldering composition, such as, a carbon. After the lay-up is complete, the lay-up is subjected to pressure using pressure bags, clamps, wrapping, and the like. The lay-up is then heated to the soldering temperature of the magnesium soldering alloy to have the magnesium soldering alloy flow, wet and solder the wire 12 to form the Gr/Mg MMC structure. Since the carbon mandrel is not wetted by the soldering composition, the mandrel can be easily removed from the structure after completion of the operation.

Figure 2:
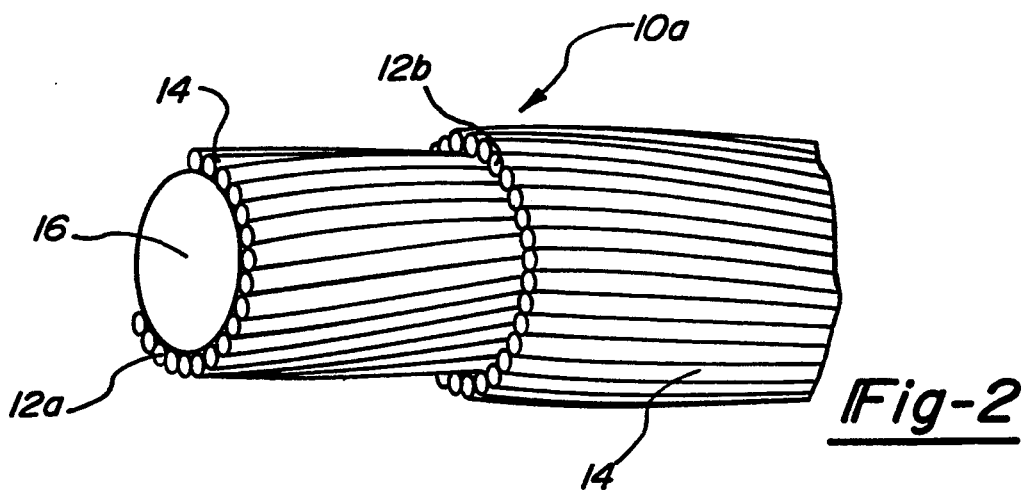
FIG. 2 shows a Gr/MMC precursor wire coated with metal soldering alloy in a spiral wound lay-up.

FIG. 2 shows an alternative lay-up 10a employing the Gr/Mg MMC wire 12 which is spirally wound on the mandrel 16. The first layer of wire 12a is wound counter-clockwise on the mandrel and the second layer of wire 12b is wound clockwise on top of the first layer. The spiral wound wires exert enough force so that other pressurization means may not be needed for the soldering operation. The wire of layers 12a and 12b are coated with the magnesium soldering alloy coating 14. After the lay-up is complete and subject to moderate pressure, the lay-up is subject to the soldering operation discussed above to have the magnesium soldering alloy coating on the wires melt, flow, wet and solder the Gr/Mg MMC wire to form the desired Gr/Mg MMC structure.

Figure 3:
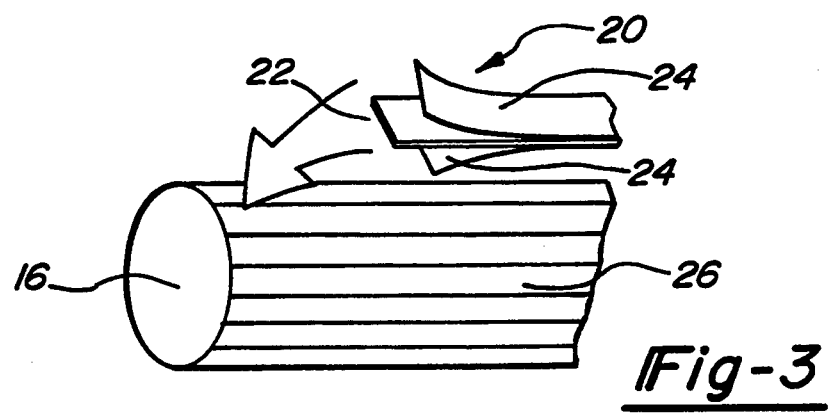
FIG. 3 is a perspective view of a Gr/MMC precursor tape sandwiched between metal soldering alloy strips in an axial lay-up.

Referring to FIG. 3, the desired structure can also be prepared from alternating strips of Gr/Mg MMC tape 22 and magnesium soldering alloys strips 24. In FIG. 3, the sandwich of tape strips are applied axially on the mandrel 16. Preferably, the tape 22 and strips 24 overlap and the tape and strips are applied in two or more layers to give the Gr/Mg MMC structure, after the soldering operation, sufficient strength. After the lay-up is completed, the lay-up is compressed at moderate pressure, such as 90–100 psig, as described above. The lay-up, subject to moderate pressure, is heated to the soldering temperature of the magnesium soldering alloy to melt, flow, solder and wet the Gr/Mg MMC precursor. After the lay-up is allowed to cool following the soldering operation, the desired Gr/Mg MMC structure is obtained.

Figure 4:
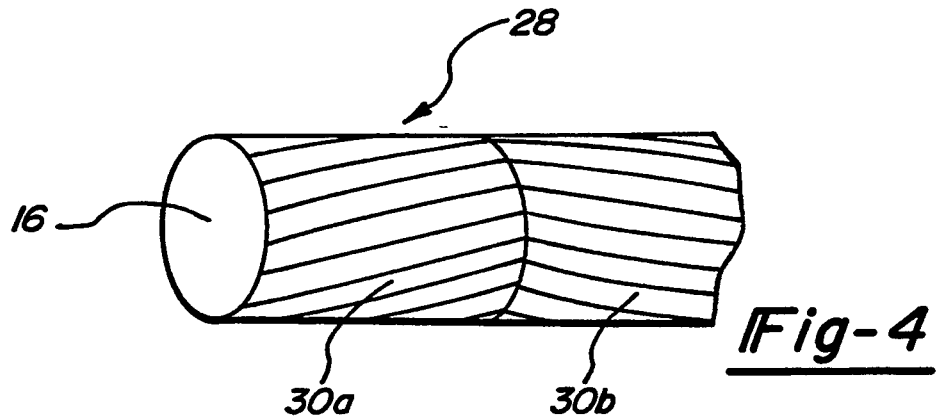
FIG. 4 is a perspective view of a Gr/MMC precursor tape sandwiched between a metal soldering alloy strip in a spiral wound lay-up.

Referring to FIG. 4, an alternate embodiment of the present invention is shown wherein the sandwich of Gr/Mg MMC precursor tape and magnesium soldering alloy strips are applied in two or more layers on the mandrel 16 with each layer spirally wound in opposing directions to yield a Gr/Mg MMC structure of enhanced strength. In the embodiment, since the layers overlap, it is not necessary to have the tape and strips overlap. The first and second layers 30a and 30b of the Gr/Mg MMC strips are wound with opposite twists to give the final structure an enhanced strength. Although the invention is illustrated with a mandrel or mold having a cylindrical shape, the mandrel or mold can have a variety of shapes to yield a final Gr/Mg MMC structure of a desired shape, such as a wing, a portion thereof, fuselage, a missile body, a space telescope frame, boat hull, auto body, and the like.

What is claimed:

1. A low pressure process for producing graphite fiber reinforced magnesium metal matrix composites (Gr/MgMMC) structures comprising the steps of sandwiching Gr/MgMMC precursors with metal soldering alloy forms consisting essentially of magnesium with one or more of aluminum, zinc, lithium and silver having a liquidus temperature between about 300° C. and about 450° C. and soldering temperature between about 325° C. and about 475° C. which are below the metal matrix melting temperature, the soldering temperature being greater than the liquidus temperature to form a Gr/MgMMC metal soldering alloy lay-up; and soldering the Gr/MgMMC metal soldering alloy lay-up by compressing the lay-up at moderate pressures while heating the lay-up to the soldering temperature of the metal soldering alloy to melt the metal soldering alloy in the lay-up and have the molten soldered alloy flow, wet and solder the Gr/MgMMC precursors of the lay-up to form the Gr/MgMMC structure.

2. A process according to claim 1 wherein the soldering step is carried out in an inert atmosphere or in a vacuum.

3. A process according to claim 2 wherein the inert atmosphere is an atmosphere of helium or argon.

4. The process according to claim 1 wherein the Gr/MgMMC composite is compressed to a pressure of up to about 100 psig while heated to the soldering temperature.

5. The process according to claim 1 wherein the magnesium metal soldering alloy contains about 68 to about 64 weight percent magnesium, about 31 to about 33 weight percent aluminum and about 1 to about 3 weight percent zinc.

6. The process according to claim 1 wherein the magnesium metal soldering alloy contains about 61 to about 57 weight percent magnesium, about 38 to about 40 weight percent lithium and about 1 to about 3 weight percent zinc.

7. The process according to claim 1 wherein the magnesium metal soldering alloy contains about 52 to about 48 weight percent magnesium, about 47 to about 49 weight percent silver and about 1 to about 3 weight percent zinc.

8. The process according to claim 1 wherein the magnesium metal soldering alloy contains about 34 to about 32 weight percent magnesium, about 34 to about 33 weight percent aluminum and about 34 to about 33 weight percent lithium.

9. A low pressure process for producing graphite fiber reinforced magnesium metal matrix composites (Gr/MgMMC) structures comprising the steps of coating Gr/MgMMC precursors with metal soldering alloy consisting essentially of magnesium with one or more of aluminum, zinc, lithium and silver having a liquidus temperature between about 300° C. and about 450° C. and soldering temperature between about 325° C. and about 475° C. which are below the metal matrix melting temperature, the soldering temperature being greater than the liquidus temperature to form a Gr/MgMMC metal soldering alloy lay-up; and soldering the Gr/MgMMC metal soldering alloy lay-up by compressing the lay-up at moderate pressures while heating the lay-up to the soldering temperature of the metal soldering alloy to melt the metal soldering alloy in the lay-up and have the molten soldered alloy flow, wet and solder the Gr/MgMMC precursors of the lay-up to form the Gr/MgMMC structure.

10. A process according to claim 9 wherein the soldering step is carried out in an inert atmosphere or in a vacuum.

11. A process according to claim 10 wherein the inert atmosphere is an atmosphere of helium or argon.

12. The process according to claim 9 wherein the Gr/MgMMC composite is compressed to a pressure of up to about 100 psig while heated to the soldering temperature.

13. The process according to claim 9 wherein the magnesium metal soldering alloy contains about 68 to about 64 weight percent magnesium, about 31 to about 33 weight percent aluminum and about 1 to about 3 weight percent zinc.

14. The process according to Claim 9 wherein the magnesium metal soldering alloy contains about 61 to about 57 weight percent magnesium, about 38 to about 40 weight percent lithium and about 1 to about 3 weight percent zinc.

15. The process according to claim 9 wherein the magnesium metal soldering alloy contains about 52 to about 48 weight percent magnesium, about 47 to about 49 weight percent silver and about 1 to about 3 weight percent zinc.

16. The process according to claim 9 wherein the magnesium metal soldering alloy contains about 34 to about 32 weight percent magnesium, about 34 to about 33 weight percent aluminum and about 34 to about 33 weight percent lithium.

* * * * *